United States Patent [19]

Brown, Sr.

[11] Patent Number: 5,358,201
[45] Date of Patent: Oct. 25, 1994

[54] VEHICLE SKID ASSEMBLY

[76] Inventor: Louis S. Brown, Sr., 401 Colbert Ave., Pensacola, Fla. 32507

[21] Appl. No.: 14,251

[22] Filed: Feb. 5, 1993

[51] Int. Cl.⁵ .................................. B64C 25/52
[52] U.S. Cl. ................................................ 244/108
[58] Field of Search .......... 244/105, 107, 108, 100 A, 244/100 R, 17.17

[56] References Cited

U.S. PATENT DOCUMENTS

| | | |
|---|---|---|
| 3,104,084 | 9/1963 | Levercheck ............. 244/108 |
| 3,116,897 | 1/1964 | Theed ................... 244/17.17 |
| 3,467,343 | 9/1969 | Violleau . |
| 3,507,466 | 4/1970 | LaFlear ................. 244/17.17 |
| 3,559,923 | 2/1971 | Moore . |
| 3,716,208 | 2/1973 | Fagan et al. . |
| 3,741,311 | 6/1973 | Fleurant . |
| 3,768,758 | 10/1973 | Kubek . |
| 3,800,896 | 4/1974 | Albertson . |
| 3,854,541 | 12/1974 | Hollnagel . |
| 3,899,036 | 8/1975 | Hollnagel . |
| 3,936,018 | 2/1976 | Barlow .................. 244/136 |
| 3,967,692 | 7/1976 | Hoffman . |
| 3,982,597 | 9/1976 | Callaway . |
| 4,000,871 | 1/1977 | DeHaai . |
| 4,019,698 | 4/1977 | Earl .................... 244/100 A |
| 4,026,502 | 5/1977 | Masclet . |
| 4,027,835 | 6/1977 | Sachs . |
| 4,062,507 | 12/1977 | Felder . |
| 4,067,516 | 1/1978 | Dobb . |
| 4,080,922 | 3/1978 | Brubaker . |
| 4,196,878 | 4/1980 | Michel . |
| 4,270,711 | 6/1981 | Cresap et al. . |
| 4,291,892 | 9/1981 | Berthold et al. . |
| 4,344,641 | 8/1982 | Lehn . |
| 4,389,029 | 6/1983 | Glasenapp et al. . |
| 4,390,151 | 6/1983 | Schneider . |
| 4,399,963 | 8/1983 | Schafer . |
| 4,519,559 | 5/1985 | Logan et al. . |
| 4,544,116 | 10/1985 | Shwayder . |
| 4,558,837 | 12/1985 | Mens et al. . |
| 4,606,516 | 8/1986 | Willison . |
| 4,613,096 | 9/1986 | Pugh . |
| 4,645,143 | 2/1987 | Coffy . |
| 4,736,906 | 4/1988 | Taillet . |
| 4,850,552 | 7/1989 | Darden et al. . |
| 4,998,717 | 3/1991 | Vaux . |
| 5,039,034 | 8/1991 | Burgess et al. . |

FOREIGN PATENT DOCUMENTS

| | | | |
|---|---|---|---|
| 1062730 | 4/1959 | France ................. 244/108 |
| 162007 | 1/1958 | Sweden ................ 244/108 |

*Primary Examiner*—Galen L. Barefoot
*Attorney, Agent, or Firm*—Finnegan, Henderson, Farabow, Garrett & Dunner

[57] ABSTRACT

A vehicle skid assembly, specifically for a helicopter, including an elastomeric material coupled to a portion of an elongated tube attached to a helicopter. A method for making a vehicle skid assembly, specifically for a helicopter, including applying an elastomeric covering to an elongated tube attached to a helicopter.

34 Claims, 5 Drawing Sheets

FIG. 8 ical attachment device which in turn is detach-
VEHICLE SKID ASSEMBLY

BACKGROUND OF THE INVENTION

1. Field of the Invention

The present invention relates to skid assemblies and more particularly to a vehicle skid assembly and method of making same.

While the present invention is subject to a wide range of vehicle applications, it is especially suited for use as a helicopter skid assembly and related methods, and will be particularly described in that connection.

2. Description of the Related Art

Helicopters typically land on skid tube assemblies, which typically include skid tubes made from expensive, lightweight, thin-walled aluminum alloys. Helicopters repeatedly take off and land on harsh surface environments which cause the abrasion and deterioration of the helicopter's skid tubes. This constant abuse causes stress and strain fractures of the skid tubes, thereby reducing the operating performance as well as the ultimate failure of the structure.

Earlier references indicate that harder materials reduce the abrasion caused by the two surfaces (landing surface and skid pad) moving in relation to one another. Such an example is U.S. Pat. No. 4,544,116 to Shwayder for a helicopter landing skid shoe pad. However, such skid pads are heavy and have a limited capacity for deformation.

In light of the foregoing, there is a need for a helicopter skid assembly which resists abrasion and deterioration, and yet has high deformation capacity and high rebound resilience.

SUMMARY OF THE INVENTION

Accordingly, it is an object of the present invention to provide a vehicle skid assembly with an elastomeric covering.

It is another object of the present invention to provide a vehicle skid assembly with an elastomeric covering removably attached.

It is another object of the present invention to provide a method for making a vehicle skid assembly with an elastomeric covering.

It is another object of the present invention to provide a method for making a vehicle skid assembly with a removable elastomeric covering.

Additional objects and advantages of the invention will be set forth in the description which follows, and in part will be apparent from the description, or may be learned by practice of the invention. The objects and advantages of the invention may be realized and obtained by means of the instrumentalities and combinations particularly pointed out in the appended claims.

To achieve the foregoing objects, and in accordance with the purposes of the invention as embodied and broadly described herein, the present invention provides for a vehicle skid assembly comprising: an elongated tube having an external surface with at least one end terminating in an arcuate configuration; an elastomeric covering coupled to at least a portion of the external surface of the elongated tube for engaging a utility surface; and means for attaching the elastomeric covered tube to the vehicle with the at least one end curving in a direction upward from the utility surface.

To further achieve the foregoing objects, the invention provides for a vehicle skid assembly comprising: an elongated tube with an external surface and vehicle attachments with at least one end terminating in an arcuate configuration; an elongated elastomeric skid pad for engaging a utility surface; and means for attaching said elongated elastomeric skid pad to at least a portion of the external surface of said elongated tube with the at least one end of said skid tube curving in a direction upward from the utility surface.

To further achieve the foregoing objects, the invention provides for a vehicle skid pad assembly for attaching a skid pad to an elongated tube having an external surface with at least one end terminating in an arcuate configuration comprising: an elongated elastomeric skid pad for engaging a utility surface; and means for attaching the elongated elastomeric skid pad to at least a portion of the external surface of said elongated tube.

To further achieve the foregoing objects a method is provided for making a vehicle skid assembly comprising: applying an elastomeric covering to an elongated skid tube for engaging a utility surface; and mounting brackets on said vehicle skid assembly for attachment to a vehicle.

To further achieve the foregoing objects a method is provided for making a vehicle skid assembly comprising: applying an elastomeric covering to an elongated skid tube for engaging a utility surface; and mounting brackets on said vehicle skid assembly for attachment to a vehicle.

To further achieve the foregoing objects a method is provided for making a vehicle skid assembly comprising: applying a filament-reinforced elastomeric covering to an annular metallic skid tube; exposing a predetermined portion of said filament in said filament-reinforced elastomeric covering; and bonding an elastomeric skid pad to said filament-exposed portion of said filament-reinforced elastomeric covering.

BRIEF DESCRIPTION OF THE DRAWINGS

The accompanying drawings, which are incorporated in and constitute a part of the specification, illustrate a presently preferred embodiment and method of the invention and, together with the general description given above and the detailed description of the preferred embodiment given below, serve to explain the principles of the invention. Of the drawings.

DETAILED DESCRIPTION OF THE INVENTION

Reference will now be made in detail to the presently preferred embodiments of the invention as illustrated in the accompanying drawings.

In accordance with the present inventions, the vehicle skid assembly includes an elongated tube having an external surface with at least one end terminating in an arcuate configuration. An elastomeric covering is provided in intimate contact with at least a portion of the external surface of the elongated tube for engaging a utility surface. Also, means are provided for attaching the elastomeric covered tube to the vehicle with the at least one end curving in a direction upward from the utility surface.

Figure 1:
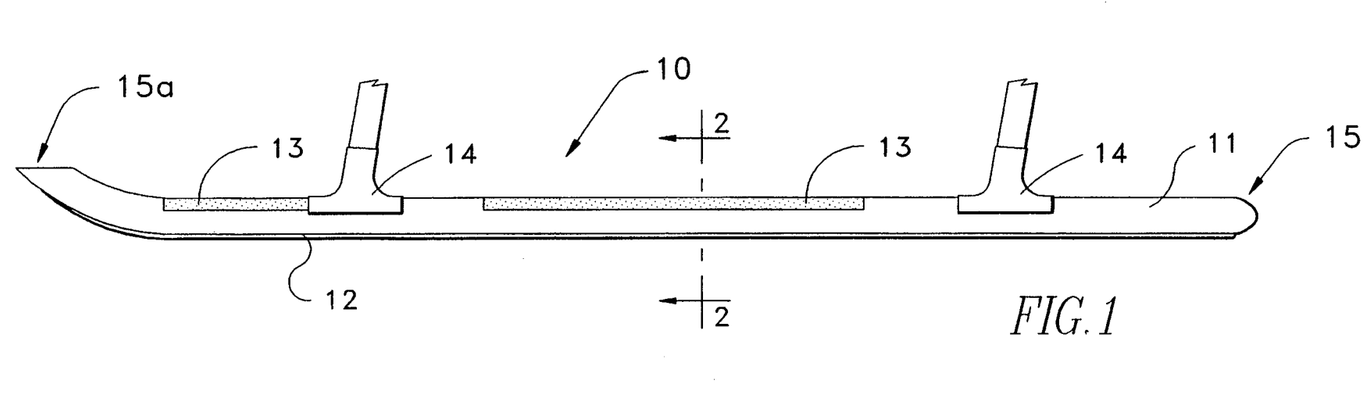
FIG. 1 is a side view of a vehicle skid assembly in accordance with the present invention.
Figure 2:
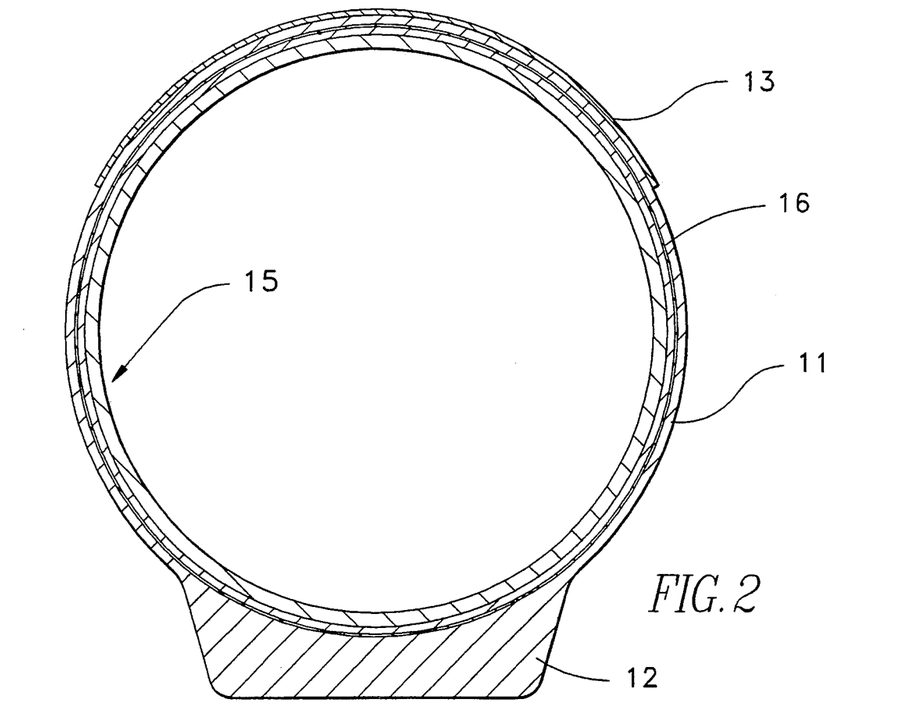
FIG. 2 illustrates a cross-section of the vehicle skid assembly shown in FIG. 1 taken along line 2—2.

As embodied herein, FIG. 1 illustrates one embodiment of a vehicle skid assembly 10 made in accordance with the present invention. Skid assembly 10 includes a skid tube 15 with an elastomeric covering 11 and a skid pad 12 having an increased thickness of elastomeric material on the utility surface-engaging bottom side of the vehicle skid assembly 10 and is attached to a helicopter (not shown) by vehicle attachments 14. The vehicle skid assembly 10 has anti-skid material 13 applied to skid tube 15 on the top side of the vehicle skid assembly 10 to prevent a person's foot from slipping off of the skid assembly. The elastomeric covering 11 is in intimate contact with at least a portion of elongated aluminum skid tube 15 (see FIG. 2). Skid tube 15 has one end 15a terminating in an arcuate configuration. Attachments 14 are positioned to orient the arcuate end 15a curving in a direction upward from the utility surface. Attachments 14 are mounting saddles and are well known to those skilled in the art.

The aluminum skid tube 15 provides the structural support for the elastomeric covering 11 and the skid pad 12 having increased thickness of elastomeric material. The elastomeric covering 11 may have reinforcing filaments 16 embedded therein (shown in FIG. 2). The elastomeric covering 11 is preferably a polyether-type urethane rubber such as the commercially-available TECHTHANE® NON-DISCOLORING WHITE. Skid pad 12 is also preferably made from a polyether-type urethane rubber such as TECHTHANE® 325 or TECHTHANE® 620.

It should be noted that in the embodiment of FIG. 1, a polyurethane is used for covering 11 and skid pad 12. However, it would be known in the art that other elastomeric compositions that exhibit the desired properties of resilience, tensile strength and high deformation capacity can be used. For example, one skilled in the art would know to replace the TECHTHANE® polyurethanes with the urethane elastomers such as disclosed in U.S. Pat. No. 4,081,429 issued to Wyman et al.

The TECHTHANE® polyurethanes, however, have excellent abrasion resistance. As shown in the table below, test results indicate that the TECHTHANE® polyurethanes are superior to resisting wear when rotated in a 50% water and 50% sand slurry for seven hours at an average velocity of 680 feet per minute. The volumetric loss for each material shown in the table is relative to the volumetric loss of carbon steel, which was set at an arbitrary value of 100. A smaller value in the table indicates a smaller loss in sample volume.

| Sample Material | Material Loss |
| --- | --- |
| TECHTHANE-80SS ® | 8 |
| TECHTHANE ® 325 | 9 |
| TECHTHANE ® 620 | 11 |
| TECHTHANE-98SS ® | 12 |
| UHMW Polyethylene | 22 |
| AR Steel | 62 |
| 304 Stainless | 82 |
| Carbon Steel | 100 |
| HD Polyethylene | 218 |
| PVC | 532 |
| 6061 Aluminum | 1042 |

Figure 3:
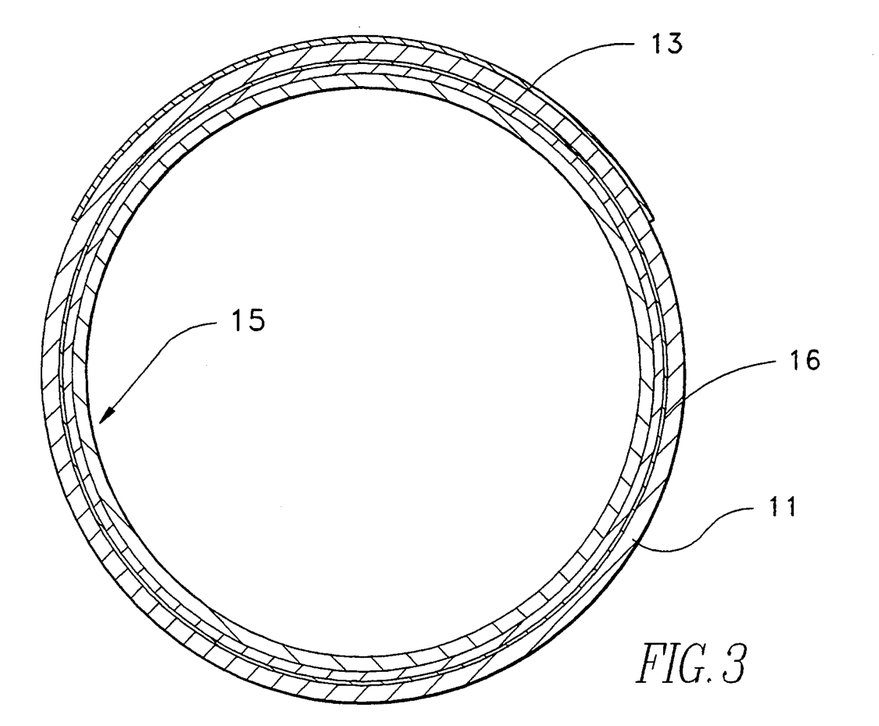
FIG. 3 illustrates a cross-section similar to FIG. 2 without the skid pad, in accordance with a second embodiment of the present invention.
Figure 4:
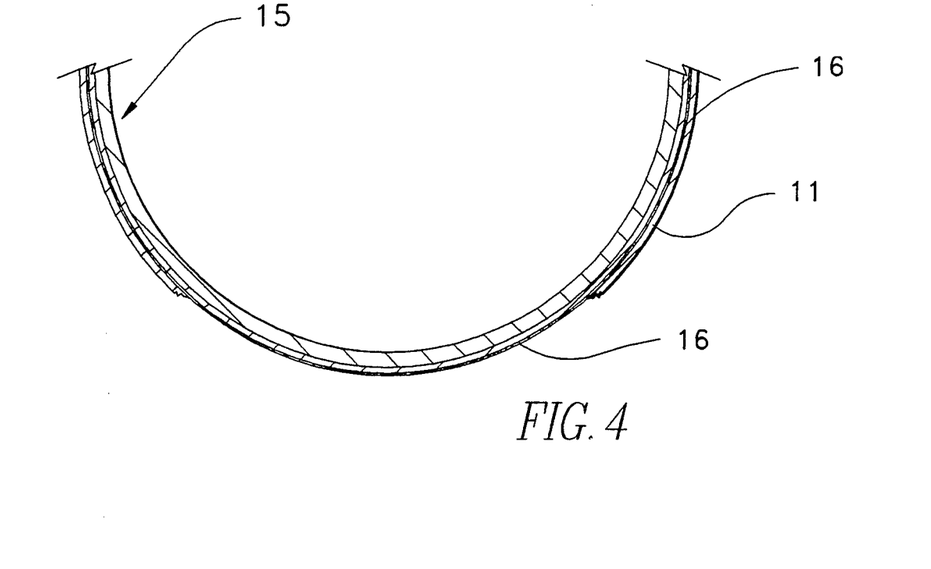
FIG. 4 is a highly magnified fragmentary cross-sectional view of the skid assembly of FIG. 3 for illustrating the exposed nylon filaments during the making of the skid assembly of FIG. 1.

The second embodiment, as shown in FIG. 3, has the elastomeric covering 11 and the nylon filament 16 as in the first embodiment. However, the skid pad 12 is not to be applied to the elastomeric covering 11 as in the first embodiment. Therefore, elastomeric covering 11 engages the utility surface in this second embodiment rather than the skid pad 12 as in the first embodiment. Additionally, the total thickness of the elastomeric covering 11 is not necessarily limited to the thickness described above for the first embodiment. Rather, the thickness may be either thicker or thinner, depending upon the application and type of materials, the use of the helicopter, and the characteristics of the utility surface.

Figure 5:
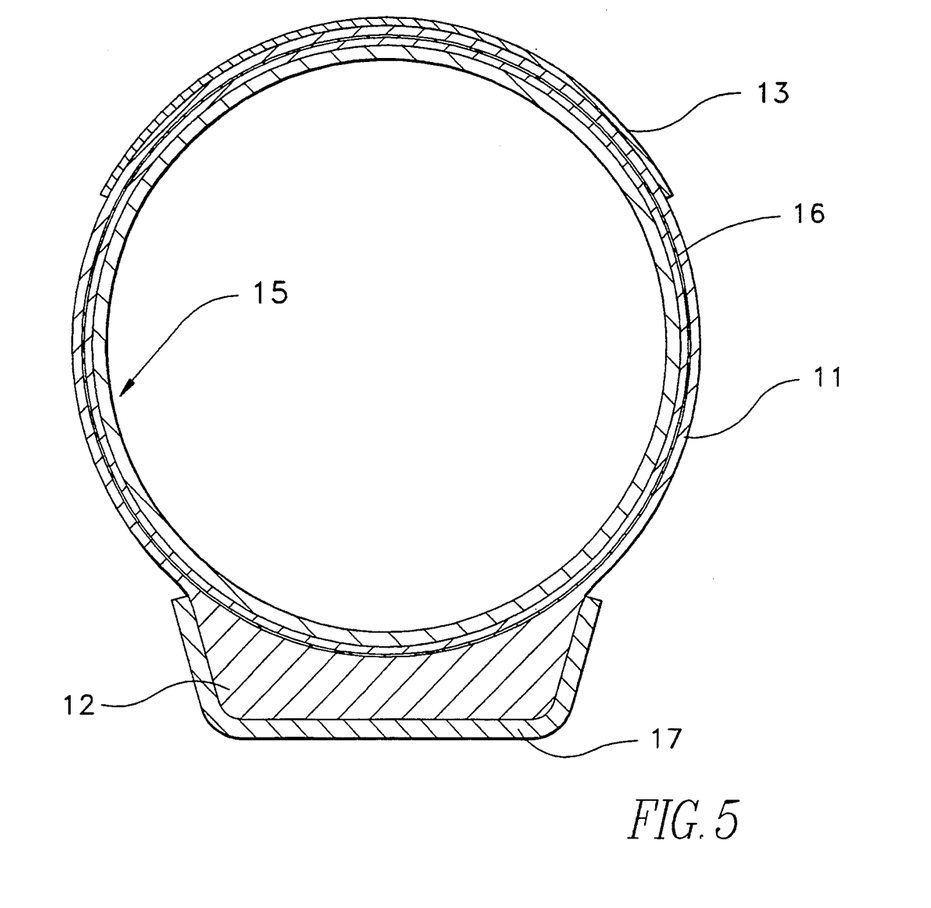
FIG. 5 is a cross-sectional view similar to FIG. 2 illustrating one method of applying the skid pad to the exposed nylon filament surface of FIG. 4.
Figure 6:
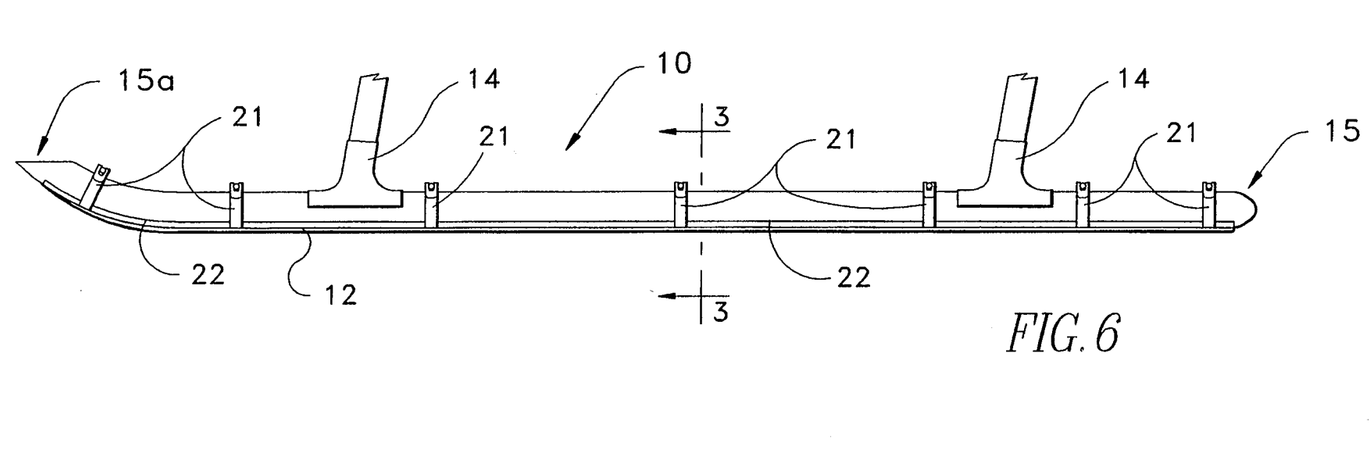
FIG. 6 is a side view of a vehicle skid assembly in accordance with a third embodiment of the present invention.
Figure 7:
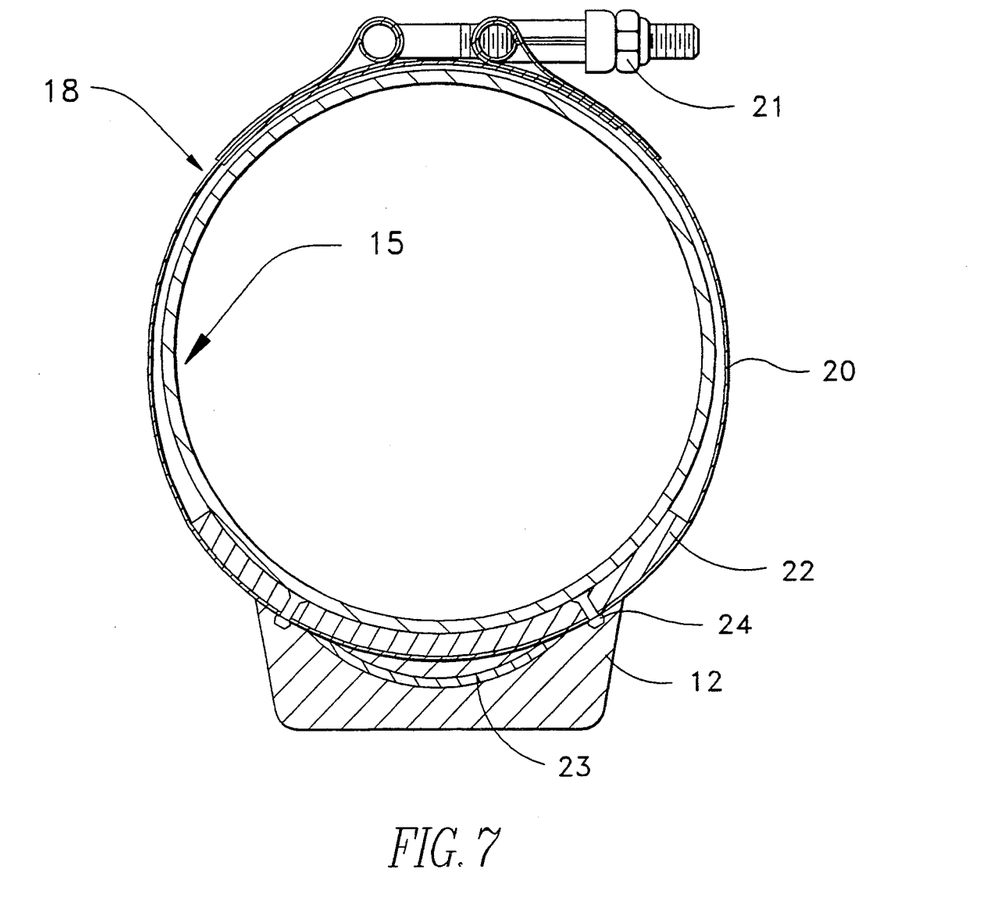
FIG. 7 illustrates a cross-section of the vehicle skid assembly shown in FIG. 6.

In the third embodiment, as shown in FIGS. 6 and 7, a skid pad 12 can be removably attached to the aluminum skid tube 15 by mechanical means generally referred to at 18. The elastomeric material can be formed in a casting mold 17 shown in FIG. 5. The third embodiment allows skid pad 12 to be attached to a skid tube 15 which, for one reason or another, cannot have a skid pad attached in the integral manner of the first embodiment, i.e., the skid tube 15 is a previously used tube.

Figure 8:
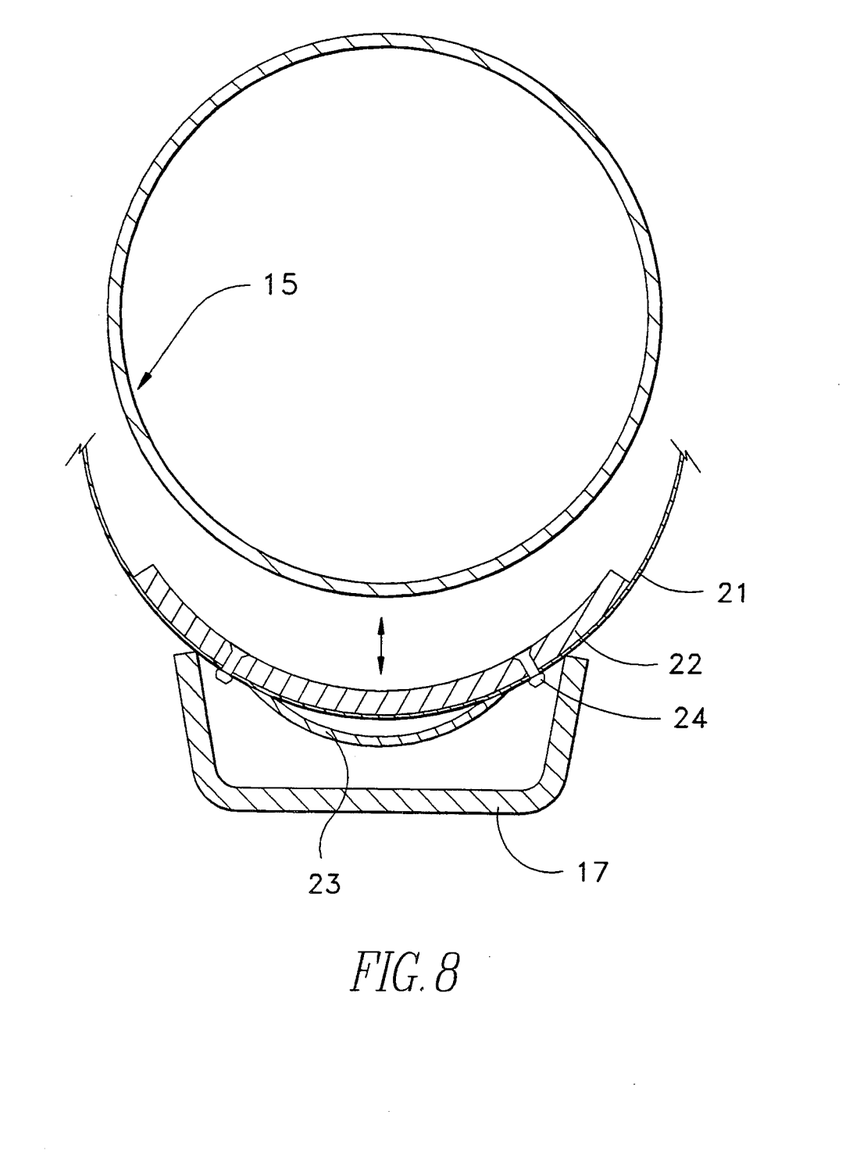
FIG. 8 is an exploded view similar to FIG. 7 illustrating one method of forming the skid pad of FIG. 7 on a mechanical attachment device which in turn is detachably fastened to the skid tube.

The mechanical means 18 is used to attach the skid pad 12 to the skid tube 15 as shown in FIGS. 6 and 7. The mechanical means 18 includes metal straps 20 and clamps 21. In the preferred embodiment, there are six to seven metal straps 20, for example, along the length of the skid tube 15 to which clamps 21 are attached. Clamps 21 may be similar to the T-bolt clamps made by Voss Aerospace for aeronautical purposes, for example. As with the Voss Aerospace T-bolt clamps, the straps 20 may be integral with clamps 21. The straps 20 are fastened by rivets, for example, to an approximately 0.093 inch thick elongated flat bar or base member 22 that is contoured to the shape of the skid tube 15. Although the base member 22 may be on either the inside (i.e., next to the skid tube 15) or on the outside of the straps 21, it is preferable for the base member 22 to be on the inside of straps 21 as shown in FIGS. 7 and 8. Attached to the base member is an elongated rigid member 23, which extends substantially throughout the length of skid tube 15, that is embedded in the skid pad 12. In the preferred embodiment, the elongated rigid member 23 is expanded aluminum, but any strong, light weight metal, preferably having openings therein, would be appropriate. The shape of the elongated rigid member 23 is preferably arcuate as shown in FIGS. 7 and 8, with a radius that is smaller than that of base member 22 and skid tube 15. However, the elongated rigid member 23 could be of any shape that would allow the two elongated side edges to be attached such as by welding, for example, to the base member 22 and/or straps 20, and still provide a sufficient space between the base member 22 and rigid member 23 so as to be embedded in skid pad 12 but not too close to the surface-engaging edge of skid pad 12. It is contemplated that rigid member 23 may be a plurality of member portions with each portion being fastened to one of the straps for example.

In making the embodiments of FIG. 1, the surface of the aluminum skid tube 15 must first be prepared. Normally, if the skid tube has not been used, it will have only a coat of primer applied to the exterior surface of the skid tube 15. If the skid tube, however, is in a complete factory configuration which consists of final paint, non-skid surface areas and anti-wear pads (i.e., hard points) (not shown) the anti-wear pads are to be removed, if possible, prior to surface preparation of the skid tube 15. If the pads are not removable, then the non-skid surface areas will become the exterior surface of the skid tube 15. Preparation of the external surface of the skid tube 15 begins with profiling the surface by sanding & applying methyl ethyl ketone (MEK) to remove all traces of oil, grease, dirt, or other foreign contaminants from the surface of the skid tube. The use of MEK as a cleaning agent is well known in the art. It is necessary to use MEK only on those areas of the skid tube 15 where the elastomeric covering 11 is to be in intimate contact with it.

After the surface of the aluminum skid tube 15 is prepared with MEK, a thin coat of a primer is applied to the external surface of the skid tube 15 where the elastomeric material 11 is desired. In the preferred embodiment, a urethane primer, such as TECHGRIP-E1 primer, is used. TECHGRIP-E1 is commercially available from Technical Urethanes, Winchester, Va. After the primer dries, a first layer of elastomeric covering 11 is sprayed over the primer (TECHGRIP-E1). The preferable elastomeric covering 11 is TECHTHANE-80SS ®. A standard airless sprayer is preferably used to apply the elastomeric covering 11 and is to be adjusted to obtain an even spray pattern at the lowest pressure possible to prevent overspray. While spraying is the preferred method of application, other methods known to those skilled in the art can also be used. The first layer of elastomeric covering 11 is approximately 10 mils thick.

Before the elastomeric covering 11 has had time to cure, a nylon filament 16, such as DuPont Type 728 nylon, is then wound around the skid tube 15 in a helical pattern as the skid tube 15, nylon filament 16 and first layer of elastomeric covering 11 are sprayed with a second, continuous coat of elastomeric material 11 to a total thickness of 70 mils (60 additional mils). Prior to curing a third layer of elastomeric material 11, preferably TECHTHANE® NON-DISCOLORING WHITE POLYURETHANE, is sprayed on the skid tube 15 for an additional 30 mil topcoat, for a total of 100 mil thickness. The skid tube assembly is then cured at 72° F. for approximately eight hours, to allow sufficient curing of the composite system before further processing of the skid tube 15. It is to be noted that each "layer," not having sufficient time to cure, is not distinguishable from the next "layer," but the term "layer" is used for convenience only. The 100 mil thickness of elastomeric covering 11 is one continuous cured layer or coating and not three separate layers.

A template (not shown) of casting mold 17 for the skid pad 12 is attached to the utility surface-engaging bottom of the skid tube 15 and is outlined on the elastomeric covering 11. Templates (not shown) are also placed over the areas on the top of the skid tube assembly 10 where the anti-skid material 13 will be applied and is also outlined in their correct configuration on the elastomeric covering 11. The areas of elastomeric covering 11 marked on the utility surface engaging bottom of the skid tube assembly 10 for the skid pad 12 are removed to expose the nylon filament 16. The preferable method of removal is grinding. However, it is understood that other methods of removal such as sanding, abrading, scuffing, buffing, etc. are also appropriate as well as other methods known to those skilled in the art. The areas previously outlined for the anti-slip coating 13 on the top of the skid assembly 10 will be buffed to a "suede-like" finish.

MEK is then used to prepare these areas for application of a primer, such as TECHGRIP-E1. The primer is applied to the previously ground and buffed areas and allowed to dry.

The casting mold 17 is then attached to the utility surface-engaging bottom of the skid tube assembly 10 to cover the exposed nylon filament 16. The elastomeric material 12, preferably TECHTHANE® 620, is then introduced into the casting mold 17 with the skid tube assembly 10 on an incline with the arcuately-configured, or front-end, of the skid tube assembly 10 oriented downward and the straight or rear end of the skid tube assembly 10 oriented upward. The elastomeric material 12 is introduced into the casting mold 17 from the arcuately-configured, or front-end, and is induced up the skid tube assembly 10 and casting mold 17 toward the straight, or rear end to ensure a quality casting. Generally, the elastomeric material 12 can be injected in the bottom of the casting mold 17, or it can be induced upward from the top of the casting mold 17 by a vacuum (not shown). The elastomeric material 12 is then allowed to dry or cure. In the case that the elastomeric material 12 is polyurethane, it will be allowed to cure for two hours at 72° F.

After the new skid pad 12 is ready, the anti-skid material is applied to the buffed areas on top of the skid tube assembly 10. The anti-skid material is preferably a mixture of TECHTHANE-98SS ® and aluminum oxide, but any anti-skid material known to those skilled in the art will be acceptable. The anti-skid material should be allowed to dry for two hours at 72° F. The skid tube assembly 10 is then placed in an oven for approximately twelve hours at 160° F. for final curing and/or drying of the elastomeric material 12.

In making the second embodiment, as shown in FIG. 3, the same method is used as for the first embodiment except that the 100 mil thickness is not ground to expose the nylon filament 16 and skid pad 12 is not formed to engage the utility surface. Rather, after the application of the 30 mil top coat, as described above, the skid assembly is allowed to cure. It should be noted that the top coat is not limited to only 30 mils, but could be thicker or thinner, depending on the conditions of use.

In making the helicopter skid assembly of FIG. 6, the straps 20 and the elongated rigid member 23 are fastened to base member 22, as previously described. Then mold 17 is removably attached to the base number 22. The elastomeric material is then introduced into the space between the mold 17 and the base member 22, and the rigid member 23 and base member 22 to embed the rigid member 23 in the elastomeric material in a manner similar to that previously described with respect to the first preferred embodiment.

Additional advantages and modifications will readily occur to those skilled in the art. For example, other types of protection may be used on the top side of the vehicle skid assembly 10 where the anti-slip material 13 is applied. Therefore, the invention in its broader aspects is not limited to the specific details, representative devices, and illustrative examples shown and described. Accordingly, departures may be made from such details without departing from the spirit or scope of the general inventive concept as defined by the appended claims or their equivalents.

What is claimed is:

1. A helicopter skid assembly for landing on a utility surface comprising:
an elongated tube having an external surface with at least one end terminating in an arcuate configuration;
a single unitary noninflatable elastomeric covering having an inner surface and an outer surface, the entirety of the inner surface of the noninflatable elastomeric covering fixedly coupled to the external surface of the elongated tube and extending substantially between the ends of the elongated tube for engaging the utility surface; and
means for attaching the elastomeric covered tube to the helicopter with the at least one end curving in a direction upward from the utility surface.

2. The helicopter skid assembly of claim 1, wherein said entirety of the inner surface of the noninflatable elastomeric covering is in intimate contact with at least a portion of the external surface of the elongated tube.

3. The helicopter skid assembly of claim 2, wherein the noninflatable elastomeric covering circumferentially surrounds the elongated tube.

4. The helicopter skid assembly of claim 3, wherein the noninflatable elastomeric covering further includes reinforcing filaments embedded therein and extending substantially in a circumferential direction.

5. The helicopter skid assembly of claim 4, wherein the noninflatable elastomeric covering includes a portion of increased thickness extending through a predetermined arc of said tube for engaging said utility surface.

6. The helicopter skid assembly of claim 5, wherein said portion of increased thickness has a substantially planar surface for engaging said utility surface.

7. The helicopter skid assembly of claim 5, wherein said portion of increased thickness has recesses therein for receiving fluids from said utility surface engaged by said skid assembly for optimizing traction with said utility surface.

8. The helicopter skid assembly of claim 9, further comprising an anti-skid material disposed on said noninflatable elastomeric covering, diametrically opposite said planar surface.

9. The helicopter skid assembly of claim 1, wherein the noninflatable elastomeric covering includes a portion of increased thickness extending through a predetermined arc of said tube for engaging said utility surface.

10. The helicopter skid assembly of claim 9, wherein said portion of increased thickness has a substantially planar surface for engaging said utility surface.

11. The helicopter skid assembly of claim 10, wherein said portion of increased thickness has recesses therein for receiving fluids from the utility surface engaged by said skid assembly for optimizing traction with said utility surface.

12. The helicopter skid assembly of claim 11, further comprising an anti-skid material disposed on said noninflatable elastomeric covering, diametrically opposite said planar surface.

13. A helicopter skid assembly for landing on a utility surface comprising:
an elongated tube with an external surface and helicopter attachments with at least one end terminating in an arcuate configuration;
a noninflatable elongated elastomeric skid pad for engaging the utility surface, the noninflatable elastomeric skid pad extending substantially between the ends of the elongated tube and having an inner surface having substantially the same contour of the elongated tube; and
means for fixedly attaching the entirety of the inner surface of said elongated noninflatable elastomeric skid pad to the external surface of said elongated tube with the at least one end of said skid tube curving in a direction upward from the utility surface.

14. The helicopter skid assembly of claim 13, wherein said means for fixedly attaching includes means for removably attaching said elongated noninflatable elastomeric skid pad to the external surface of said elongated tube.

15. The helicopter skid assembly of claim 13, wherein said means for fixedly attaching includes T-bolt clamps.

16. The helicopter skid assembly of claim 13, wherein said means for fixedly attaching includes a plurality of straps integrally secured to said elongated noninflatable elastomeric skid pad; and a plurality of clamp means connected to each one of said plurality of straps for securing said elongated noninflatable elastomeric skid pad to said elongated tube.

17. The helicopter skid assembly of claim 13, wherein said plurality of means for fixedly attaching includes:
an elongated base member having substantially the same contour of said elongated tube;
a plurality of strap members spaced longitudinally along said elongated base member and each strap member extending laterally for fastening said noninflatable elongated skid pad to said elongated skid tube; and
an elongated rigid member mounted to said base member with opposite edges of said rigid member positioned to oppose the base member and embedded in said noninflatable elastomeric skid pad.

18. The helicopter skid assembly of claim 17, wherein said elongated rigid member is an expanded aluminum member.

19. The helicopter skid assembly of claim 17, wherein said rigid mounted member is fastened to at least one of said straps and said elongated base member.

20. A vehicle skid pad assembly for attaching a skid pad to an elongated tube having an external surface with at least one end terminating in an arcuate configuration comprising:
a noninflatable elongated elastomeric skid pad for engaging a utility surface, the noninflatable elastomeric skid pad extending substantially between the ends of the elongated tube and having an inner surface having substantially the same contour of the elongated tube; and
means for fixedly attaching the entirety of the inner surface of the elongated noninflatable elastomeric skid pad to the external surface of said elongated tube.

21. A method of making a helicopter skid assembly for landing on a utility surface comprising:

applying a noninflatable elastomeric covering to at least a portion of an elongated skid tube for engaging a utility surface, the noninflatable elastomeric covering having an inner surface and an outer surface, wherein the entirety of the inner surface of the noninflatable elastomeric covering is fixedly coupled to the external surface of the elongated tube; and mounting brackets on said helicopter skid assembly for attachment to a helicopter.

22. The method of making the helicopter skid assembly of claim 21, wherein the step of applying the noninflatable elastomeric covering further comprises applying a noninflatable elastomeric covering circumferentially around the at least a portion of said elongated tube.

23. The method of making the helicopter skid assembly of claim 22, further comprising applying an anti-skid material to the noninflatable elastomeric covering at predetermined locations.

24. The method of making the helicopter skid assembly of claim 22, wherein the method further comprises applying a filament reinforcement in said noninflatable elastomeric covering and around the elongated tube.

25. The method for making the helicopter skid assembly of claim 22, wherein the method further comprises making recesses in said noninflatable elastomeric covering for optimizing traction on said utility surface.

26. A method of making a helicopter skid assembly for landing on a utility surface comprising:

circumferentially applying a filament-reinforced noninflatable elastomeric covering to at least a portion of an annular metallic skid tube;

exposing a predetermined portion of said filament in said filament-reinforced noninflatable elastomeric covering; and bonding an noninflatable elastomeric skid pad to at least said filament-exposed portion of said filament-reinforced noninflatable elastomeric covering for engaging the utility surface.

27. The method for making a helicopter skid assembly of claim 26, wherein the method further comprises applying an anti-skid material to said filament-reinforced noninflatable elastomeric covering at predetermined locations.

28. The method for making a helicopter skid assembly of claim 26, wherein the step of circumferentially applying a filament-reinforced noninflatable elastomeric covering to an annular metallic skid tube comprises the substeps of applying a first layer of a noninflatable elastomeric material and winding a filament around the skid while applying a second layer of noninflatable elastomeric material.

29. The method for making a helicopter skid assembly of claim 26, wherein exposing a predetermined portion of said filament in said filament-reinforced noninflatable elastomeric covering includes grinding a portion of the noninflatable elastomeric covering away to expose said portion of said filament.

30. The method for making a helicopter skid assembly of claim 26, wherein bonding a noninflatable elastomeric skid pad to at least said exposed portion of filament-reinforced noninflatable elastomeric covering includes securing a mold in tight contact with said filament-reinforced noninflatable elastomeric covered skid tube, introducing an noninflatable elastomeric material into said mold under vacuum pressure and removing said mold after a predetermined time.

31. The method for making the helicopter skid assembly of claim 26, wherein the method further comprises making recesses in said filament-reinforced noninflatable elastomeric covering for optimizing traction on said utility surface.

32. A helicopter skid assembly for landing on a utility surface comprising:

an elongated tube having an external surface with at least one end terminating in an arcuate configuration;

a single noninflatable elastomeric covering having an inner surface and an outer surface, the entirety of the inner surface of the noninflatable elastomeric covering fixedly coupled to the external surface of the elongated tube for engaging the utility surface; and means for attaching the elastomeric covering tube to the helicopter with the at least one end curving in a direction upward from the utility surface.

33. A helicopter skid assembly for landing on a utility surface comprising:

an elongated tube having an external surface with at least one end terminating in an arcuate configuration;

a elastomeric covering coupled to the external surface of the elongated tube for engaging the utility surface; and means for attaching the elastomeric covered tube to the helicopter with the at least one end curving in a direction upward from the utility surface, wherein said elastomeric material is selected from the group consisting of TECHTHANE 80SS, TECHTHANE 325, TECHTHANE 620, or TECHTHANE 98SS.

34. A helicopter skid pad assembly for attaching a skid pad to an elongated tube having an external surface with at least one end terminating in an arcuate configuration comprising:

a noninflatable elongated elastomeric skid pad for engaging a utility surface, the noninflatable elastomeric skid pad extending substantially between the ends of the elongated tube and having an inner surface having substantially the same contour of the elongated tube; and means for fixedly attaching the entirety of the inner surface of the elongated noninflatable elastomeric skid pad to the external surface of said elongated tube.

* * * * *

UNITED STATES PATENT AND TRADEMARK OFFICE
CERTIFICATE OF CORRECTION

PATENT NO. : 5,358,201

DATED : October 25, 1994

INVENTOR(S) : Louis S. Brown, Sr.

It is certified that error appears in the above-identified patent and that said Letters Patent is hereby corrected as shown below:

Claim 8, col. 7, line 52, "claim 9" should read --claim 7--.

Signed and Sealed this

Seventh Day of February, 1995

Attest:

BRUCE LEHMAN

Attesting Officer     Commissioner of Patents and Trademarks